INVENTORS
GRAYDON L. BROWN,
JIMMY R. COLE,
DELBERT W. FAIR &
DOUGLAS S. SULLIVAN
BY William J. Miller
ATTORNEY

United States Patent Office 3,293,598
Patented Dec. 20, 1966

3,293,598
METHOD AND APPARATUS FOR MINIMIZING EFFECTS OF PHASE DISTORTION IN SEISMIC PROSPECTING
Graydon L. Brown, Jimmy R. Cole, Delbert W. Fair, and Douglas S. Sullivan, Ponca City, Okla., assignors to Continental Oil Company, Ponca City, Okla., a corporation of Oklahoma
Filed Mar. 4, 1964, Ser. No. 349,336
3 Claims. (Cl. 340—15.5)

This invention relates generally to an improved method and apparatus for minimizing the effects of phase distortion, such as the phase distortion caused by the instrumentation, in distance measuring systems.

More specifically, but not by way of limitation, this invention relates to a method and apparatus for minimizing the effects of phase distortion normally present in seismic records obtained by cross-correlating a reference input signal (used to control an earth vibrator) with the signals detected by geophones positioned on the ground.

The phase distortion referred to above comprises two parts: one which varies with each vibrator location and is due to the variations in the coupling of the vibrator with the earth, and the other which has fixed characteristics and is produced by the detecting, amplifying and recording instruments. A preferred system for reducing and eliminating the variable phase distortion has been described and claimed in a copending patent application, U.S. Serial No. 237,852 filed on November 15, 1962 by one of the present applicants and is assigned to the assignee of the present invention.

The present invention, in its most specific aspects, relates to the prevention of the distorting effects produced by the phase distortion taking place in the instrumentation.

In a method of seismic prospecting using the correlation technique (see, for example, U.S. Patents No. 2,688,124 and No. 2,989,726), a seismic wave oscillatory signal of controlled frequency content is generated by a vibrator at one surface point and the reflections of the seismic wave signals from the various subsurface strata interfaces are detected and recorded at another surface point. The oscillatory signal usually lasts several seconds and changes in frequency at a predetermined rate between an upper and a lower limit, or vice versa. Such a signal is commonly referred to as a sweep.

The signal detected by the geophones comprises numerous reflections of the sweep signal and is a very complex waveform when recorded. Since the reflections may be spaced at minute fractions of a second while the sweep signal generated by the vibrator lasts several seconds, it is clear that the several reflected sweeps overlap to a considerable degree. However, in the correlation process, wherein the complex signal of the geophone is cross-correlated with the sweep signal generated by the vibrator, each individual reflected sweep is detected, in turn, and its time of occurrence is made evident and accurately measurable.

The record produced in the correlation process is indicative of the degree of coherency between the complex signal of the geophone and the sweep signal generated by the vibrator as the latter is time shifted with respect to the former. Thus, if the geophone signal is phase distorted by the instruments used in its detection, amplification, recording and playback, the degree of coherency between the reflection components and the reference sweep signal will be degraded, and, correspondingly, the correlation record will deteriorate. However, if the reference sweep signal is similarly distorted, the coherency will be restored and the correlation record will be enhanced.

Accordingly, one object of the present invention is to provide a method and apparatus for minimizing the effects of the phase distortion inherent in the detection, amplification, recording and playing back of signals detected by geophones when they are cross-correlated with a reference input signal.

A more general object of this invention is to increase the precision obtainable in interpreting the results of a distance measuring system, such as a seismic prospecting system.

Another object of this invention is to provide a method and apparatus for producing a correlation record in which the individual events are made more discrete by minimizing the phase distortion inherent in the instrumentation used to detect, amplify and record the geophone signal.

Many additional objects and advantages of the present invention will be evident from the following detailed description, when read in conjunction with the accompanying drawings, wherein.

Figure 1:
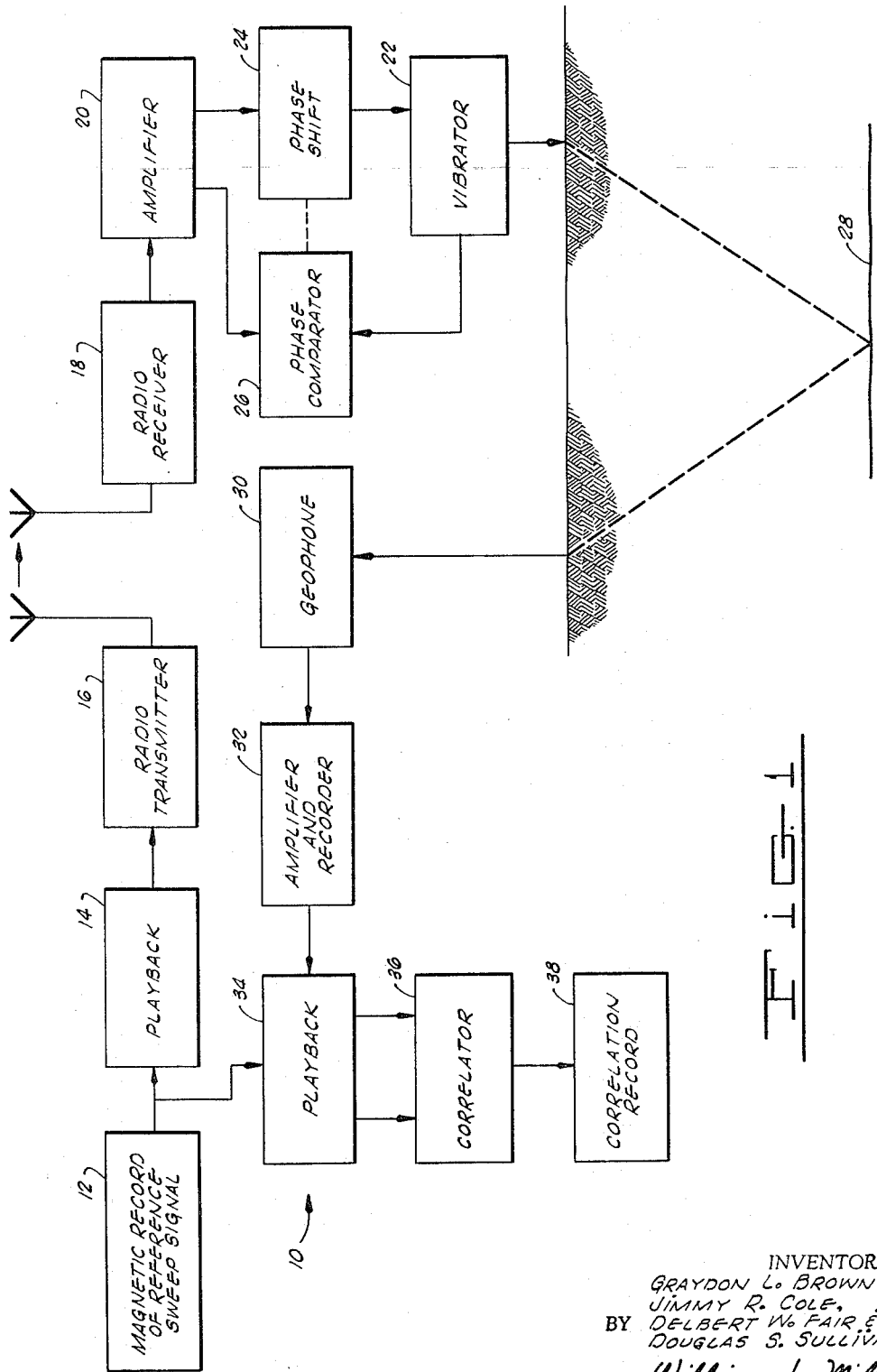
FIG. 1 is a diagrammatic representation of a system, used prior to the present invention, in practicing a method of seismic prospecting by cross-correlation of the geophone signal with the reference sweep signal.

Referring now to FIG. 1, reference character 10 generally designates a system of the type used prior to this invention. The system 10 utilizes a magnetic record 12, usually a wide magnetic tape having the capacity for a large number of adjacent channels, on which a reference sweep signal has been recorded. As previously mentioned, this sweep signal is usually an oscillatory signal lasting several seconds and having a predetermined frequency content. The record 12 is placed on a rotating drum 14, or any other playback means, to generate a signal used to modulate a radio transmitter 16. The part of the system 10 which has been described so far is actually located on the recording truck (not shown) of the operating crew.

The radio signal transmitted by the transmitter 16 is sensed by the antenna of a radio receiver 18, and after demodulation and detection, the output of this receiver is amplified by amplifier 20 and used to drive a servo-controlled transducer in the form of a vibrator 22 through a phase shifting network 24. The vibrator 22 generates the oscillatory seismic signal imparted to the ground. The output of the vibrator 22 is detected, as at the base plate of the vibrator, and fed to a phase comparator 26. The phase comparator 26 compares the output of the amplifier 20 and the output of the vibrator 22 and produces an error signal for electrically or mechanically controlling the phase shifting network 24. The phase shifting network 24 and phase comparator 26 may be of any suitable design, whereby the vibrator input signal is phase shifted to at least partially compensate for the phase distortion caused by the vibrator and the variations in coupling of the vibrator to the earth. The output of the amplifier 20 is usually referred to herein as the input signal since it is the signal which controls the vibrator 22.

The seismic signal thus generated travels through the stratified ground and is reflected by underground strata interfaces 28. The reflected signal returns to the surface where it is detected by a transducer in the form of a geophone 30 which converts the seismic energy back to electrical energy. The output of the geophone 30 is amplified and recorded as a field record in an amplifier and recorder 32. This amplifier-recorder combination 32 is actually that which was used to produce the original magnetic record of the sweep signal, and the amplified geophone signals are actually recorded on adjacent channels of the previously mentioned magnetic tape 12.

The magnetic record 12 thus contains both the reference sweep signal and the amplified versions of the geophone signals. By placing this record on a drum 34, or any other playback means, which may very well be the playback means 14 previously mentioned, it is possible to simultaneously regenerate the reference sweep signal and the field record signal. These two signals are fed to a correlator 36 whose output, a correlation record 38, is indicative of the amount of coherency between the two signals as their time phase relationship is varied, and, therefore, is indicative of the presence and the reflection times of the interfaces 28.

In such correlation systems, the quality of the correlation record is severely limited if substantial phase distortion exists between the reflected signal components of the geophone signal and the reference sweep signal. All of the instrumentation used in the system 10 produce a specific phase distortion of the signals on which it operates and this distortion is always the same. The distortion can be evidenced by eliminating the earth propagation portion of the system 10, such as by putting the geophone 30 directly on the base of the seismic vibrator 22. It has been found that, when this is done, the shape of the cross-correlation of the signal generated by the vibrator 22 with the reference sweep signal is seriously phase distorted when compared to the auto-correlation of the reference sweep signal, and this distortion produces an objectionable deterioration of the correlation record produced in field operations.

Figure 2:
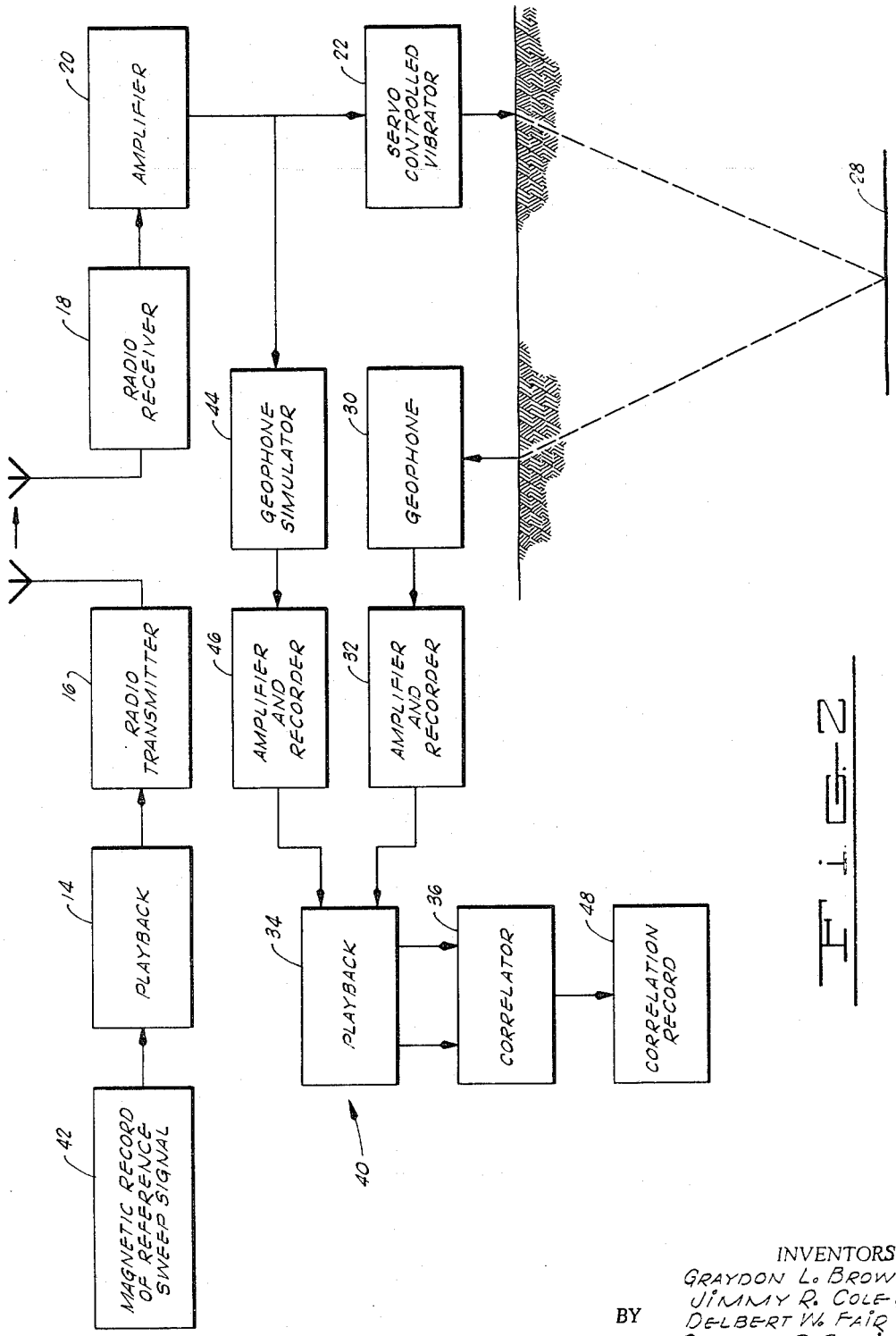
FIG. 2 is a diagrammatic representation of a system embodying the teachings of the present invention when practicing the improved method of seismic prospecting by cross-correlation of the geophone signal with a counterpart signal produced by a distortion applied to the reference sweep signal.

A system which does not contain these shortcomings will now be described in conjunction with FIG. 2. This novel system 40 utilizes a magnetic record 42, similar to the record 12 of FIG. 1, on which the reference sweep signal has been stored. This record is placed on a playback means 14 as in the system 10. The signal produced by this playback operation is used to modulate the radio transmitter 16. Again, the part of the system which has been described so far is actually located on the recording truck (not shown) of the operating crew. The radio signal is sensed by the antenna of the radio receiver 18 and after demodulation and detection, the output is amplified by the amplifier 20 and used to drive the servo-controlled vibrator 22 which generates the oscillatory seismic signal imparted to the ground. The vibrator 22 is controlled in the system 40 with a phase comparator and phase shifting network the same as in the system 10 of FIG. 1, but these components are not shown in FIG. 2, merely for simplicity of illustration.

The seismic signal propagating through the ground, and comprising the signal reflected at subsurface strata interfaces 28, is detected by the geophone 30 which converts the seismic energy back to electrical energy. The output of the geophone 30 is amplified and recorded as a field record signal in an amplifier and recorder 32 which, like the amplifier-recorder combination 32 of FIG. 1, is usually that which was used to produce the original magnetic record 42. The amplified geophone signals are actually recorded on adjacent channels of the magnetic tape 42 on which the reference sweep signal had been stored.

The output of amplifier 20, which was used to drive the servo-controlled vibrator 22 through a phase shifting network, may be considered a representation of the signal produced by the vibrator and applied to the earth. For this reason it is referred to as an input signal and a replica of such signal is used to produce a counterpart signal against which the amplified geophone signal is correlated. Thus, whatever phase distortion took place in the communication channel (playback 14, transmitter 16 and receiver 18) is automatically eliminated.

In addition to the communication channel phase distortion, a substantial phase distortion will occur in the operations necessary to detect, amplify and record the seismic signal energizing the geophone 30. The effects of this phase distortion can be eliminated if the input signal (or a replica thereof) is applied to a geophone simulator 44 which has a phase response similar to that of the geophone 30, and if the output of the geophone simulator is amplified and recorded by an amplifier-recorder combination 46 having the same phase response as the combination 32. In practice, these two combinations are merely parallel channels of a multichannel recorder.

Thus, the amplified geophone signals are recorded on adjacent channels of the magnetic tape 42 used to record the counterpart signal (the modified version of the vibrator input signal). By placing this tape on the drum 34 or any other reproducer which may very well be the playback means 14 as previously described, it is possible to simultaneously regenerate the counterpart signal and the field record signal representative of the seismic signal received by the geophone 30. These two signals are applied to the correlator 36 to produce an improved correlation record 48. In this new correlation record, the waveshape indicative of each reflected signal arrival has minimum phase distortion, since all of the instrumentation phase distortion has been cancelled. It has a more discrete and symmetrical aspect and, consequently, makes the correlation record more easily and more accurately interpretable.

The effect of phase distortion is thus minimized by cross-correlating the amplified geophone signal with a counterpart signal obtained by passing the vibrator input signal through the same instrumentation (or an equivalent thereof). The instrumentation has a phase characteristic which is the same at all times and thus does not vary during field operations. The processes of magnetic recording and playback, and radio transmission and reception introduce significant phase distortion at low frequency. However, this part does not appear in the correlation record 48 of the new system 40 since the counterpart signal used in the correlator 36 has suffered the same distortion.

The most severe phase distortion is caused by the geophone 30 and recording amplifier 32, and this distortion is eliminated by passing the vibrator input signal through the geophone simulator 44 and the amplifier-recorder combination 46 which has the same characteristics as the amplifier-recorder combination 32 used to record the geophone signal. The geophone simulator 44 is a circuit designed to produce a phase distortion of the input signal equivalent to the phase distortion produced by the geophone 30. Since no conversion from elastic energy to electrical energy is involved in the geophone simulator 44, only the electrical equivalent of the geophone 30 is desired. The electrical characteristics of the geophone 30 are completely defined by considering a plot of the geophone output voltage as a function of the frequency when the geophone is shaken with a constant driving velocity, and a similar plot of the phase between the output and the input at the various frequencies. When plotted on a logarithmic frequency scale, these curves, indicated as FIG. 3 and FIG 4, respectively, are called the amplitude and phase response characteristics of the geophone.

Figure 5:
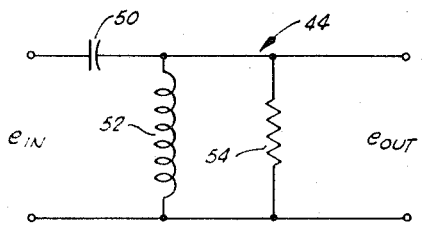
FIG. 5 is a schematic representation of a circuit used to produce a phase distortion similar to that of the geophone.

These responses are recognized as those of a high-pass quadratic filter which is equivalent to the electrical circuit shown in FIG. 5. In this circuit, a capacitance 50, an inductance 52 and a resistance 54 produce the desired result. As is known in the art, the natural frequency of the geophone 30 is determined by the mass of the moving coil and the spring constant of the supporting spring. In the simulator 44, the natural frequency is correspondingly determined by the magnitudes of the capacitance 50 and the inductance 52. The magnitude of the resistance 54 in the simulator is determined to match the geophone damping.

The natural frequency of the geophone 30 is most easily determined by a phase response test since a phase lead of $\pi/2$ corresponds to the natural frequency regardless of the damping of the geophone. Similarly, the electrical equivalent is most readily adjusted by selecting the components to provide a phase lead of $\pi/2$ at the same natural frequency, and then by selecting resistance 54 to provide the best fit to the rest of the phase response curve of FIG. 4.

Figure 3:
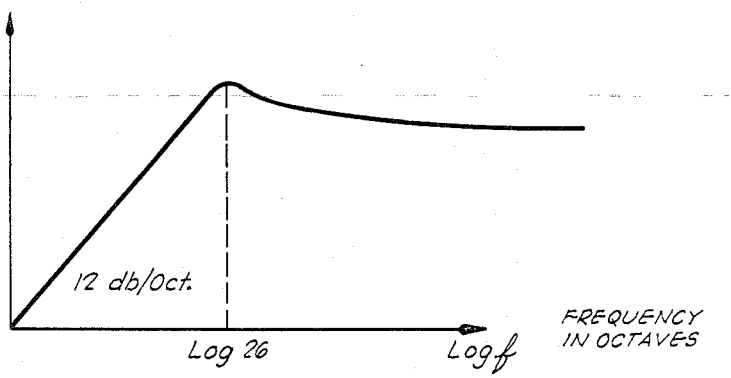
FIG. 3 is an illustration of the amplitude response of a typical geophone used in seismic prospecting.
Figure 4:
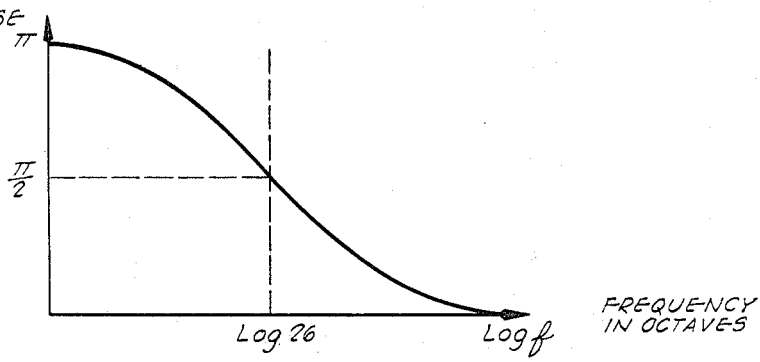
FIG. 4 is an illustration of the corresponding phase response of the same geophone.
Figure 6:
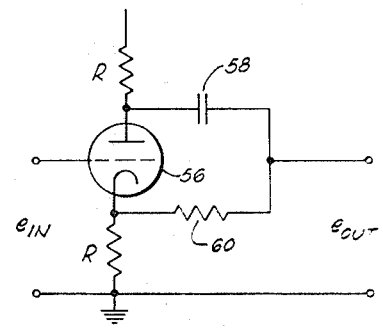
FIG. 6 is a schematic representation of another circuit which may be used to produce a phase distortion similar to that of the geophone.

It will also be noted by those skilled in the art that the phase response of a critically damped geophone 30, as shown in FIG. 4, is the same as the phase response of a particular type of all-pass network, such as schematically illustrated in FIG. 6. This network comprises a suitable triode 56, such as one-half of a 12AX7 tube having equal resistances R in its plate and cathode circuits. The output is taken from the plate through a capacitance 58 and from the cathode through a resistance 60. The amplitude response of the network shown in FIG. 6 will be flat, as contrasted with being variable as shown in FIG. 3, but such response has been found to facilitate the subsequent correlation of a vibrator input signal passed through the network. Thus, the network shown in FIG. 6 may be used as the geophone simulator 44 with good results.

In actual practice, when all the elements of the system 40 have been assembled, a reference sweep signal is transmitted from the transmitter 16 on the recording truck to the receiver 18 on the vibrator truck, and the input signal used to drive the vibrator 22 is cabled back to the recording truck and passed through the geophone simulator 44 with the proper settings. This signal is then recorded on magnetic tape as previously described.

Having thus described a particular embodiment of the present invention, it is to be understood that various changes, alterations and substitutions can be made therein without departing from the spirit and scope of the present invention as defined by the appended claims.

What is claimed is:
1. A method for seismic prospecting comprising:
 (a) recording a seismic signal on a recording medium that is to be transmitted into the ground;
 (b) operating a transducer in contact with the ground in accordance with the recorded seismic signal;
 (c) maintaining the output phase of said transducer signal in synchronism with the phase of said recorded seismic signal;
 (d) receiving said seismic signal transmitted into the ground by a seismic signal receiving means in contact with the ground at a location spaced from said transducer;
 (e) simultaneously applying said recorded seismic signal to a phase distortion network having a phase response versus frequency characteristic substantially identical to that of said seismic signal receiving means;
 (f) recording said phase distorted seismic signal along with the signal received by said seismic signal receiving means, on a recording medium in side by side relation and in time synchronism with each other;
 (g) correlating said recorded and distorted seismic signal with said signal received by said seismic signal receiver means;
 (h) recording said correlated signal.

2. A method as defined in claim 1 wherein the phase distorted input signal replica and the output of the second transducer are recorded with the same recorder.

3. A method as defined in claim 1 wherein the first and second records are reproduced with the same reproducer.

References Cited by the Examiner
UNITED STATES PATENTS

| | | | |
|---|---|---|---|
| 2,864,072 | 12/1958 | Blake | 340—3 |
| 2,989,726 | 6/1961 | Crawford et al. | 340—3 |
| 3,061,813 | 10/1962 | Geyer | 340—15.5 |
| 3,076,177 | 1/1963 | Lawrence et al. | 340—15.5 |
| 3,162,756 | 12/1964 | Lawrence | 340—15.5 X |
| 3,209,317 | 9/1965 | Webster | 340—3 |

SAMUEL FEINBERG, *Primary Examiner.*

BENJAMIN A. BORCHELT, *Examiner.*

R. M. SKOLNIK, *Assistant Examiner.*